April 7, 1931.　　　　P. H. GEIGER　　　　1,799,683

ELECTRICAL MEASURING APPARATUS

Original Filed Jan. 9, 1930

INVENTOR:
P. H. Geiger,
by A. R. Vencill
His Attorney

Patented Apr. 7, 1931

1,799,683

UNITED STATES PATENT OFFICE

PAUL H. GEIGER, OF ANN ARBOR, MICHIGAN, ASSIGNOR TO THE UNION SWITCH & SIGNAL COMPANY, OF SWISSVALE, PENNSYLVANIA, A CORPORATION OF PENNSYLVANIA

ELECTRICAL MEASURING APPARATUS

Application filed January 9, 1930, Serial No. 419,558. Renewed January 15, 1931.

My invention relates to electrical measuring apparatus of the type involving a copper oxide rectifier and a direct current meter for measuring alternating current quantities. One feature of my invention is the provision of means for compensating for variations in the readings given by such apparatus due to variations in the frequency of the alternating current.

I will describe two forms of apparatus embodying my invention, and will then point out the novel features thereof in claims.

Figure 1:
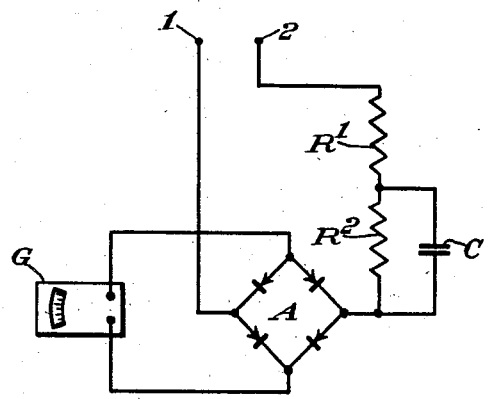
Figure 2:
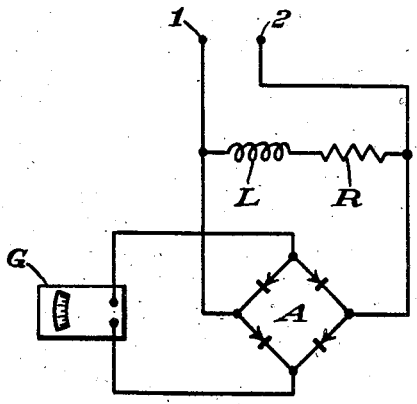

In the accompanying drawing, Fig. 1 is a diagrammatic view showing one form of apparatus for reading alternating voltages and embodying my invention. Fig. 2 is a diagrammatic view showing one form of apparatus for reading alternating currents and embodying my invention.

Similar reference characters refer to similar parts in each of the views.

Referring first to Fig. 1, the reference characters 1 and 2 designate the terminals of a source of alternating current the voltage of which is to be measured. The input circuit of a copper oxide rectifier A is connected with the terminals 1 and 2 through the usual multiplier resistances $R^1$ and $R^2$, and a direct current meter G is connected with the output circuit of the rectifier A.

Considering only the parts thus far described, when a given voltage of relatively low frequency is applied across the terminals 1 and 2, a certain current will flow through the rectifier A and the meter G, so that this meter will give one reading. If the same voltage at a higher frequency is applied to terminals 1 and 2, the output current of the rectifier A, as read by the meter G, will decrease, because part of the input current will be shunted from meter G due to the internal capacitance of the rectifier. In order to compensate for these variations in meter readings due to frequency variations, I connect a condenser C across a portion of the multiplier resistance, such as across the resistance element $R^2$. Due to this condenser, the input current to the rectifier will increase as the frequency of the applied voltage increases, and by correctly proportioning the elements $R^1$, $R^2$ and C, this increase in the input current may be made to compensate for the loss due to the shunting action of the internal capacitance of the rectifier, with the result that for a given voltage the reading given by meter G will be the same regardless of the frequency of the voltage.

Current measurements compensated for frequency changes may be made by connecting the combination shown in Fig. 1 across a resistance through which flows the current to be measured.

Another form of apparatus for measuring alternating currents is shown in Fig. 2, wherein the input side of the rectifier A is shunted by a resistance R and an inductance L connected in series. As the frequency increases, the impedance of the shunt will increase, thereby increasing the current supplied to the rectifier A. By correctly proportioning the parts, the shunting action of the internal capacitance of the rectifier may be exactly compensated, so that for a given current the reading of the meter G will be the same regardless of the frequency.

Another valuable feature of the apparatus shown in Fig. 2, is that it may be made to have a substantially constant impedance throughout a large range of frequencies. This is a very desirable characteristic for certain applications, such, for example, as the measurement of the output power of a vacuum tube where the input may be of a complex wave form, or where the output is to be measured for a number of widely varying frequencies. Since the output of a tube depends upon the impedance to which it supplies energy, the impedance of a measuring instrument used in the output circuit should not vary with frequency.

Where, in the accompanying claims, I have used the expression "frequency responsive impedance," I mean the capacitative impedance C of Fig. 1, or the inductive impedance L of Fig. 2.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. Electrical measuring apparatus comprising a copper oxide rectifier having its input terminals supplied with alternating current, a direct current meter connected with the output terminals of said rectifier, and a multiplier resistance and a condenser included in the input circuit of said rectifier for compensating for variations in the amount of current shunted from the meter due to variations in the internal capacitance of the rectifier in response to variations in the frequency of the applied current.

2. Electrical measuring apparatus comprising a copper oxide rectifier having its input terminals supplied with alternating current, a direct current meter connected with the output terminals of said rectifier, a multiplier resistance included in the input circuit of said rectifier, and a condenser connected in shunt with a portion of said resistance for compensating for variations in the amount of current shunted from the meter due to variations in the internal capacitance of the rectifier in response to variations in the frequency of the applied current.

3. Apparatus for measuring alternating current values, comprising a copper oxide rectifier having its input terminals supplied with alternating current the value of which is to be measured, a direct current meter connected with the output terminals of said rectifier, and means including a frequency responsive impedance connected in the input circuit of said rectifier for compensating for variations in the amount of current shunted from the meter due to variations in the internal capacitance of the rectifier in response to variations in the frequency of the applied voltage.

4. Electrical measuring apparatus comprising a copper oxide rectifier having its input terminals supplied with alternating current, a direct current meter connected with the output terminals of said rectifier, and a reactance and a resistance connected in series across the input terminals of said rectifier for compensating for variations in the amount of current shunted from the meter due to variations in the internal capacitance of the rectifier in response to variations in the frequency of the applied current.

In testimony whereof I affix my signature.

PAUL H. GEIGER.